2 Sheets—Sheet 1.
H. FRASCH.
Apparatus for Distillation of Oil.
No. 205,792. Patented July 9, 1878.
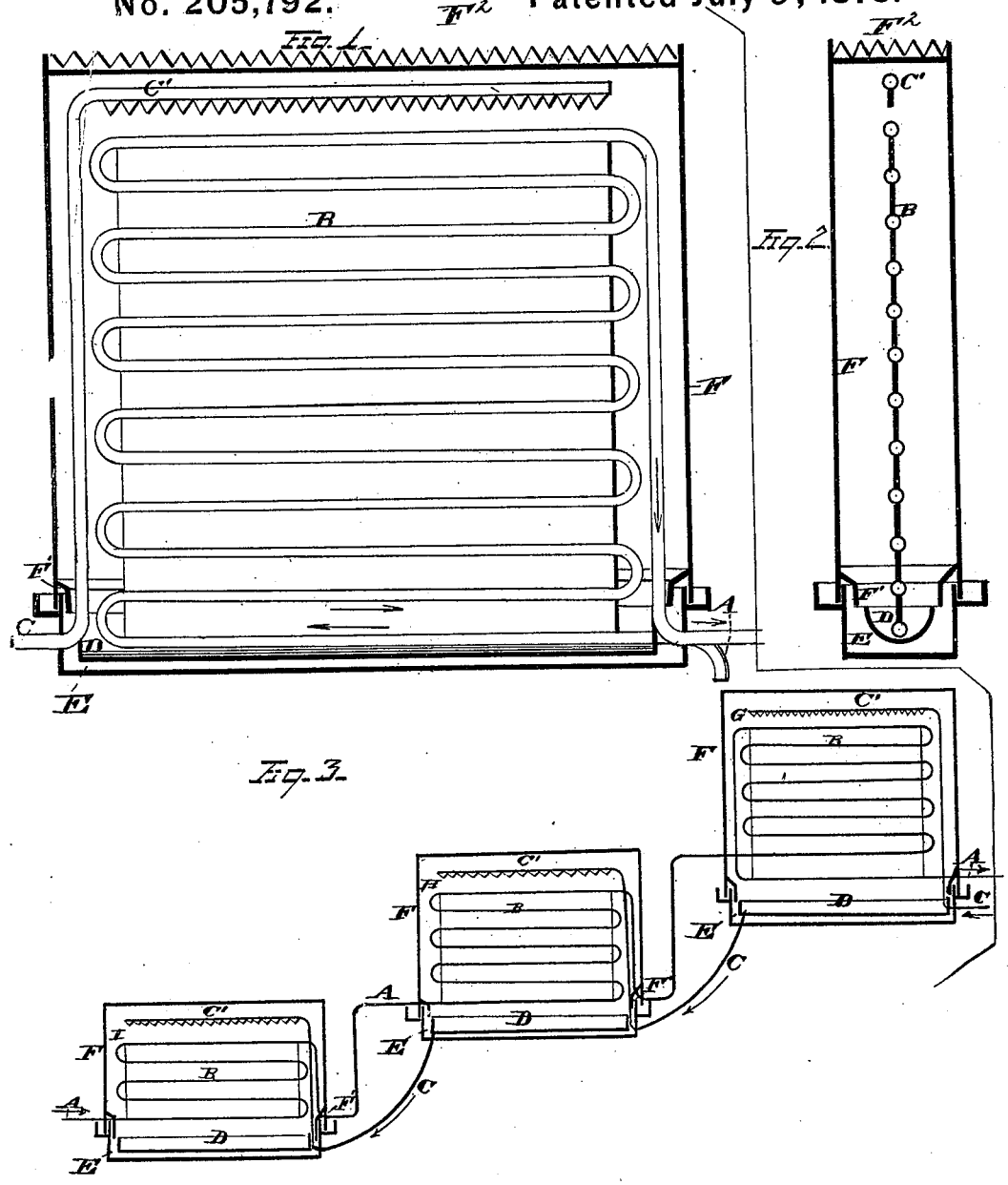

2 Sheets—Sheet 2.
H. FRASCH.
Apparatus for Distillation of Oil.
No. 205,792. Patented July 9, 1878.
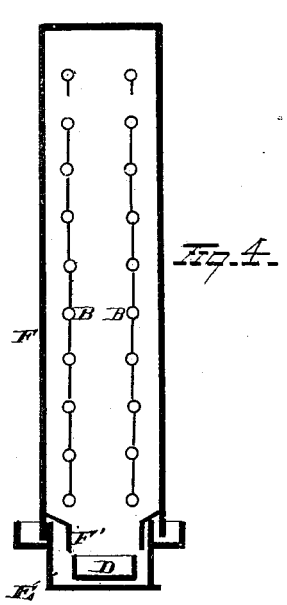
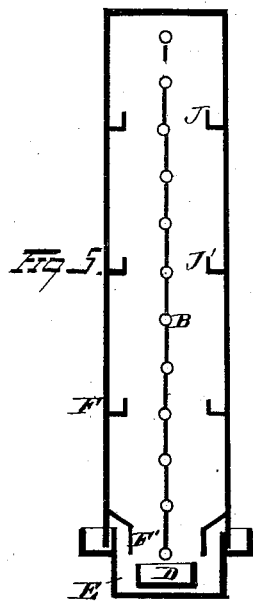
WITNESSES
INVENTOR

UNITED STATES PATENT OFFICE.

HERMAN FRASCH, OF CLEVELAND, OHIO.

IMPROVEMENT IN APPARATUS FOR DISTILLATION OF OILS.

Specification forming part of Letters Patent No. 205,792, dated July 9, 1878; application filed August 3, 1877.

*To all whom it may concern:*

Be it known that I, HERMAN FRASCH, of Cleveland, in the county of Cuyahoga and State of Ohio, have invented certain new and useful Improvements in Apparatus for Fractional Separation or Distillation of Oil; and I do hereby declare the following to be a full, clear, and exact description of the invention, such as will enable others skilled in the art to which it pertains to make and use it, reference being had to the accompanying drawings, which form part of this specification.

My invention consists of the apparatus hereinafter described and claimed for effecting a fractional separation or fractional distillation of oils or other liquids into their various liquid products.

The apparatus is not limited in its operation to petroleum, but is equally applicable for the separation of any liquid into its various products of different specific gravity by distillation, or into its different degrees of volatility—as, for instance, ammonia—from water and other and similar liquids.

In the drawings, Figure 1 is a longitudinal central section of an apparatus illustrating my invention. Fig. 2 is a cross-section of the same. Fig. 3 represents a series of apparatus such as are shown in Fig. 1 connected together. Fig. 4 represents a variation of the invention, wherein more than one heating-surface are employed. Fig. 5 is another variation of my invention, wherein the same apparatus is employed for collecting in one chamber several liquid products of different specific gravity or different degrees of volatility.

A is a pipe for conveying steam, warm air, or water, &c., to a coil or surface or other suitable device, B, for imparting heat to the oil that is to be separated. C is a pipe or device for conveying the oil to be treated, and for distributing it through perforations or along a suitable drip, C', upon the heating-surfaces.

D is a trough, located beneath the heating apparatus, for the purpose of gathering and conveying away to any suitable locality those portions of the oil that have not been volatilized by the heat. E is a similar trough, for conveying away the liquid products that may have condensed upon the condenser.

F is the condenser, made of metal or any suitable material, which sits down over the vaporizer in such a manner as to embrace it, with a water-joint at the base, and to oppose the condensing-surface to the heating-surface in such a manner that the vapors which arise from the oil will be immediately condensed upon the surface of the condenser. For this purpose I prefer that the surface of the condenser shall be in close proximity to the heating-surface, so that just as soon as the vapors are given off from the oil or liquid they will be immediately condensed. It should also be supplied with a safety-valve of such double function as to prevent bursting or collapse.

The temperature of the condenser F may be reduced by distributing a stream of cold water over its external surface, or by the use of an evaporating substance, such as cloth or other fibrous material or fabric that will present a large evaporating-surface or detain the cold water in its passage over the condenser. In some cases it would be preferable to deflect the inner wall of this condenser at the base outward, and return it upward, so as to form a chamber for containing a cooling-liquid, which may be fed at the bottom of the chamber, thereby presenting the coldest condensing-surface opposite the vapor generated at the highest heat. I do not, however, limit myself to this mode of securing or maintaining a proper temperature for effective condensation.

In the drawing, the top of the hood or condenser F is represented as provided with a serrated rim or edge, $F^2$, so that water or other vaporizable liquid may run over the surface and run out in little streams or drips through the throats formed by the serrated edges. Any other suitable appliance, however, may be employed for the purpose instead of the serrated rim.

The hood or condenser F is provided with an inwardly-shelving flange or drip at its lower end, or at various points above, the object being that the products of condensation may flow down the sides of the condensing-surface and be deflected into the proper trough or receptacle below, and thence, by a proper conductor, supplied with a trap, if necessary, conveyed to a receiver outside, instead of passing down and out beneath the edge of the hood. This flange is shown at F¹.

I do not limit myself to a single sheet or coil as a heating-surface. There may be any number of such surfaces. So, also, as shown in the the drawings, this device might be adapted to operate in a series, in which event G might be the first, H the second, and I the third, of a series, and so on. In that event each separate apparatus in the series would serve to collect its proper liquids. Thus crude petroleum might be fed through the pipe C into the condenser G. Steam, superheated, if necessary, hot air, or hot water, on entering through the pipe A, would highly heat the vaporizer B in the lower device I, would heat the apparatus H less, and furnish a still lower degree of heat to the upper device. The petroleum passing upon the vaporizing-surface at G, the low degree of heat would drive off the most highly volatile ingredients. Such of them as might be condensed would be condensed upon the surface of the hood. That portion which was not vaporized would pass to the next apparatus H, and, passing upon its more highly-heated vaporizer, its less volatile ingredients would become vaporized, and would condense upon the hood H, while the unvaporized liquid would pass on to the next still, and, under the influence of the high heat, might be there totally evaporated, or so much of the volatile products driven off and condensed as might be desired.

It is apparent that the same principle may be applied in a single apparatus collecting liquid products of condensation, which liquid products shall be of different specific gravity or of different degrees of volatility. For this purpose the hood or condenser might be provided with sundry troughs for collecting the vapors that may condense at different levels.

Now, it is apparent that the vaporizer is more highly heated at the bottom than at the top, and that the more volatile ingredients will be given off in the upper portion of the hood, while less volatile ingredients, or ingredients of lower specific gravity, will be given off as a higher heat is approached, so that the result is that in the upper trough J, Fig. 5, there is a more volatile liquid than that contained in the next trough, J', below, or in any of the succeeding troughs beneath. By multiplying the number of troughs J the oil may be divided into as many products of different specific gravity or different degrees of volatility as there are heating pipes or surfaces of different temperature.

I desire to be understood as recognizing the present state of the art, in that different apparatuses have constructions similar to mine in its broad features; and hence my invention consists in the construction set forth by the following claims.

I am aware that petroleum or its distillates have been separated into liquids of different specific gravity by permitting the oil to pass, substantially as I pass it, in drops upon a vaporizing-surface which increases in temperature as the oil progresses in its course. This operation, however, has been conducted within a retort or still, and the vapors arising have been directed through a communicating passage into a separate condenser and there condensed, while the liquid that remained after passing over the vaporizing-surface was collected below. This process, however, was open to the objection that some of the vapor of the less volatile ingredients would necessarily condense upon the interior surface of the still, and would flow down into the oil below and, of course, impair its fire-test, because the fire-test of the whole liquid is necessarily that of its most volatile inflammable ingredient.

So, also, I am aware that it has been suggested to pass the oil or liquid to be separated down through an open trough that passes around and around the inside of a vessel which is itself a condensing-surface, there being in the bottom of the trough a pipe through which steam or other heating-fluid is caused to pass. More or less of the vapor thus given off would condense upon the inner condensing-wall of the chamber, and pass off through a separate opening from that contained in the trough; but this is open to precisely the same objection as the last named, because the inner projecting surfaces of the trough, being of less temperature than the vaporizing-surfaces, or the liquid in contact with the vaporizing-surface, would operate as a condenser to condense and cause to flow back into the liquid in the trough, and out of the chamber with the latter, those least volatile of the ingredients vaporized, and the result would be that such recondensed ingredients would reduce the fire-test of the liquid that has passed through.

But by my invention the liquid is passed over a vaporizing-surface, there being no surface upon which the vapor given off can condense, except the adjacent condensing-surface of the chamber itself. Therefore the only possible condensation that can take place must be upon that surface, and that product is conveyed away by a separate passage, and not permitted to pass back again, either upon the vaporizing-surface or into the liquid that has once been passed over the vaporizer. The result is that the fire-test of the liquid that has been treated is not in the slightest degree impaired by recondensation of vapors given off, and the product is therefore of certain, and not, as heretofore, of doubtful, fire-test.

Having fully described my invention, what I claim as new, and desire to secure by Letters Patent, is—

1. The combination, with the vaporizer, of the hood or condenser and a pipe, which latter conveys the liquid above the vaporizer and discharges it over the latter, said hood or condenser being made readily removable from the vaporizer and connected with the remaining apparatus by a water-joint at its base, substantially as set forth.

2. The combination, with the vaporizer, of the hood or condenser formed with the water-chamber on its top, said water-chamber extending over its entire upper surface, and provided with notched or serrated sides, adapted to discharge its contents in little streams or drippings over the vertical sides of the hood, substantially as set forth.

3. The combination, with the vaporizer B, provided with the trough D, of the hood or condenser F and trough E, substantially as set forth.

4. The combination, with the vaporizer and condenser, of the distillate-receivers J J', &c., formed in a vertical series upon the side wall of the condenser, substantially as set forth.

5. The condenser or hood F, provided with the deflecting flanges or drips $F^1$, substantially as set forth.

6. The apparatus for separating from oil its more volatile ingredients and for collecting the different products, which consists in a vaporizer, feeding mechanism for delivering the liquid to be treated in drops, films, spray, or other disseminated form upon the vaporizer, said vaporizer being disconnected from any condensing-surface that would direct any condensed ingredient back into the liquid that has passed over the vaporizer, and a condenser adjacent to the vaporizer, said vaporizer and condenser each provided with separate conduits and receptacles for collecting the products, substantially as and for the purposes set forth.

7. In an apparatus for separating from oil its more volatile ingredients and for collecting the different products, a vaporizer, feeding mechanism for delivering the liquid to be treated in drops, films, spray, or other disseminated form upon the vaporizer, said vaporizer being disconnected from any condensing-surface that would direct any product of condensation back into the liquid that has passed over the vaporizer, and in connection therewith a condenser substantially parallel with and in such close proximity to the vaporizer that the vapors set free will be condensed as soon as they are given off, said condenser and vaporizer provided with separate conduits to gather the respective products, substantially as and for the purposes set forth.

8. In an apparatus for separating from oil its more volatile ingredients, and for collecting separately those condensable ingredients that are of different specific gravity, a vaporizer, feeding mechanism for delivering the liquid in drops, films, spray, or other disseminated form upon the vaporizer, said vaporizer being disconnected from any condensing-surface that would direct any product of condensation back into the liquid that has passed over the vaporizer, and, in combination therewith, a condenser closely adjacent to the vaporizer, adapted to condense the vapors as soon as they are given off without permitting them to mix with those given off from the hotter portions of the vaporizer, said condenser provided with conduits at different points for collecting separately the condensed vapors given off from differently-heated portions of the vaporizer, substantially as and for the purpose set forth.

In testimony whereof I have signed my name to this specification in the presence of two subscribing witnesses.

HERMAN FRASCH.

Witnesses:
F. TOUMEY,
W. E. DONNELLY.